United States Patent
Neuman

(10) Patent No.: US 8,284,209 B2
(45) Date of Patent: Oct. 9, 2012

(54) SYSTEM AND METHOD FOR OPTIMIZING DISPLAY BANDWIDTH

(75) Inventor: Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 1178 days.

(21) Appl. No.: 11/304,282

(22) Filed: Dec. 15, 2005

(65) Prior Publication Data

US 2007/0139400 A1    Jun. 21, 2007

(51) Int. Cl.
 *G06T 1/60* (2006.01)
(52) U.S. Cl. .......................... 345/530; 345/660
(58) Field of Classification Search .................. 345/530, 345/660
See application file for complete search history.

(56) References Cited

U.S. PATENT DOCUMENTS

| | | | |
|---|---|---|---|
| 5,760,784 A * | 6/1998 | Bullis et al. ................ | 345/660 |
| 6,263,020 B1 * | 7/2001 | Gardos et al. ............ | 375/240.03 |
| 6,486,909 B1 * | 11/2002 | Pirim ........................ | 348/143 |
| 6,536,043 B1 * | 3/2003 | Guedalia ................... | 725/90 |
| 6,563,506 B1 * | 5/2003 | Wang ........................ | 345/535 |
| 6,661,427 B1 * | 12/2003 | MacInnis et al. ........... | 345/660 |
| 7,308,003 B2 * | 12/2007 | Lev et al. .................. | 370/474 |
| 7,406,548 B2 * | 7/2008 | Owens et al. .............. | 710/60 |
| 2003/0135867 A1 * | 7/2003 | Guedalia .................. | 725/126 |
| 2004/0184523 A1 * | 9/2004 | Dawson et al. ............ | 375/240.1 |
| 2005/0122341 A1 * | 6/2005 | MacInnis et al. .......... | 345/558 |
| 2005/0249483 A1 * | 11/2005 | Bramley .................... | 386/111 |
| 2006/0017850 A1 * | 1/2006 | Hsieh et al. ............... | 348/564 |
| 2006/0038922 A1 * | 2/2006 | Hsieh et al. ............... | 348/564 |

* cited by examiner

*Primary Examiner* — Maurice L McDowell, Jr.
(74) *Attorney, Agent, or Firm* — Thomas, Kayden, Horstemeyer & Risley, LLP

(57) ABSTRACT

Aspects of a system and method for optimizing memory bandwidth in a video system may comprise examining different combinations of input and output video formats and video processes that occur between the input and output of the video system. For each combination, a desirable memory bandwidth may be determined, where the desirable memory bandwidth may ensure a maximum system data rate is not exceeded. After determining the desirable values for all combinations of input and output video formats, an optimal value may be selected, where the optimal value may ensure that for any of the combinations the maximum system data rate is not exceeded.

24 Claims, 6 Drawing Sheets

SYSTEM AND METHOD FOR OPTIMIZING DISPLAY BANDWIDTH

RELATED APPLICATIONS

This application is related to the following applications, each of which is hereby incorporated herein by reference in its entirety:

U.S. patent application Ser. No. 10/314,525 filed Dec. 9, 2002;
U.S. patent application Ser. No. 11/304,281 filed Dec. 15, 2005; and
U.S. patent application Ser. No. 11/300,782 filed Dec. 15, 2005.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing video signals. More specifically, certain embodiments of the invention relate to a method and system for optimizing display bandwidth.

BACKGROUND OF THE INVENTION

Generally in video systems live video is captured and stored in memory, and fed into a video processing unit before being sent out for display on a video output device. Processing can involve such functions as, for example, scaling, compositing, and format conversion. Scaling can be horizontal and/or vertical, where scaling in one direction can involve increasing or decreasing the pixels per line, thus increasing or decreasing the size of an image and its format. Compositing can involve overlaying the video with a layer of graphics or text. Such processes may have an effect on the bandwidth of the memory of the system. For example, format conversions often cause an increase or decrease in the amount of memory required for capturing an input or an output into the memory.

In some instances, the size of the video captured is larger before processing than afterwards. In such instances, the system uses more bandwidth for capturing the video than may be necessary. In other instances, capturing the video before processing is more efficient, since some scaling and format change can convert the video to a size or format that requires more bandwidth.

Most systems require different memory bandwidth usage for each format and for different scale factors. In some instances cropped images and PIP images can have very large memory bandwidth, which can approach infinity because an entire source image needs to be read within a small fixed amount of time. This can cause serious malfunctions and problems in video systems. Some designs have attempted to solve this problem by detecting format changes and whenever a format change was detected, the rate at which data is captured in the system gets changed. The problem is that changing the rate at which data is captured every time there is a format change at the input and/or the output can become inefficient.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for optimizing, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the present invention relate to processing video. More specifically, certain embodiments of the present invention relate to optimizing the display bandwidth in a video system. Aspects of the invention may comprise examining different combinations of input and output video formats and video processes that occur between the input and output of the video system. For each combination, a desirable memory bandwidth may be determined, where the desirable memory bandwidth may ensure a maximum system data rate is not exceeded. After determining the desirable values for all combinations of input and output video formats, an optimal value may be selected, where the optimal value may ensure that for any of the combinations the maximum system data rate is not exceeded.

Figure 1A:
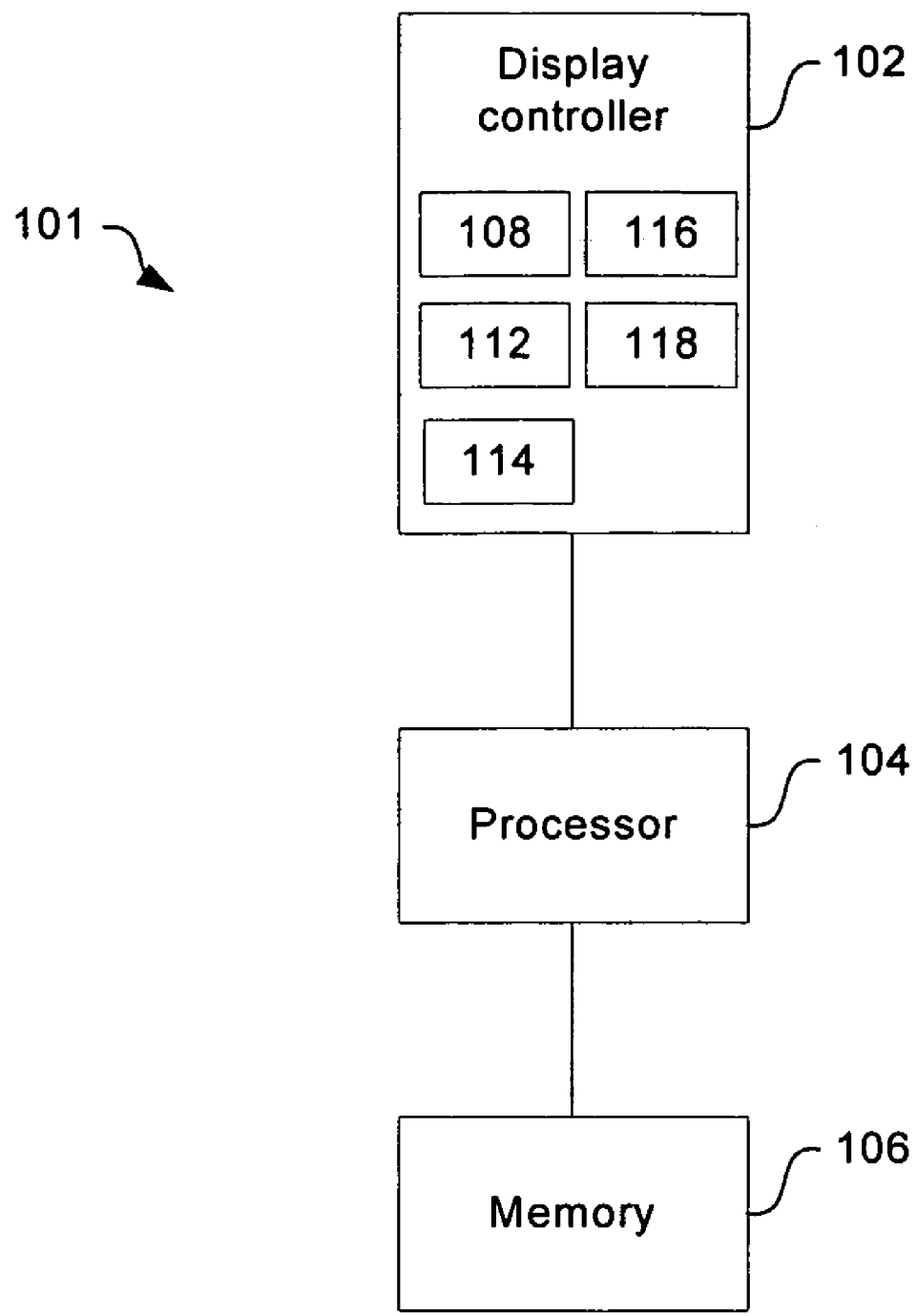
FIG. 1a illustrates a block diagram of an exemplary architecture for positioning of a display controller, in accordance with an embodiment of the present invention.

FIG. 1a illustrates a block diagram of an exemplary architecture for positioning of a display controller, in accordance with an embodiment of the present invention. Referring to FIG. 1a, the display system 101 may comprise a display controller 102, a processor 104, and a memory 106. The display controller 102 may comprise suitable logic, code, and/or circuitry that may be adapted to display video frames/fields. The display controller 102 may be utilized in a video network (VN). The display controller may be capable of accepting different inputs as video sources such as, for example, MPEG, VDEC, ITU-656, and HD-VDI sources. The processor 104 may comprise suitable logic, code, and/or circuitry that may be adapted to control the operation of the display controller 102 and to transfer control information and/or data to and from the memory 106. The memory 106 may comprise suitable logic, code, and/or circuitry that may be adapted to store control information, data, and information regarding video frames/fields. The display controller 102 may comprise components such as, for example: a scaler 108, a video feeder 112, a capture processor 114, a compositor 116, and/or a VEC 118.

The processor 104 may be capable of determining a single memory bandwidth value for use during video processing that generates output video data for display from input video data, wherein utilizing such a single memory bandwidth value during video processing ensures that the overall data rate of the system does not exceed a maximum data rate allowed by the video processing system. The memory bandwidth value may be independent of the format of the input video data, the format of the output video, and the video processing that generates the output video data for display from the input video data.

In an embodiment of the present invention, in determining the single memory bandwidth, the processor 104 may examine different combinations of input video formats, output video formats, and the processes that may be used to generate the output video for display from the input video data. The selected single memory bandwidth may ensure that data rates associated with the different combinations of input video, output video, and processes do not exceed a maximum data rate allowed by the video processing system. The processor 104 may also make decisions regarding an optimal order of processes such as, for example, scaling of the input video and capturing of the video to the memory 106.

In an embodiment of the present invention, the scaler 108 may scale the input video when signaled by the processor 104 to perform scaling of an input video. The processor 104 may send a signal for capturing of the video to take place, in which case, the capture processor 114 may capture video frames/fields, before or after the scaler 108, depending on a decision made by the processor 104 regarding the order in which the processes are to be performed.

The processor 104 may also send signals to the video feeder 112, the compositor 116, and the VEC 118 to process the video frames/fields according to the processing needed for the system to generate the output video from the input video.

Figure 1B:
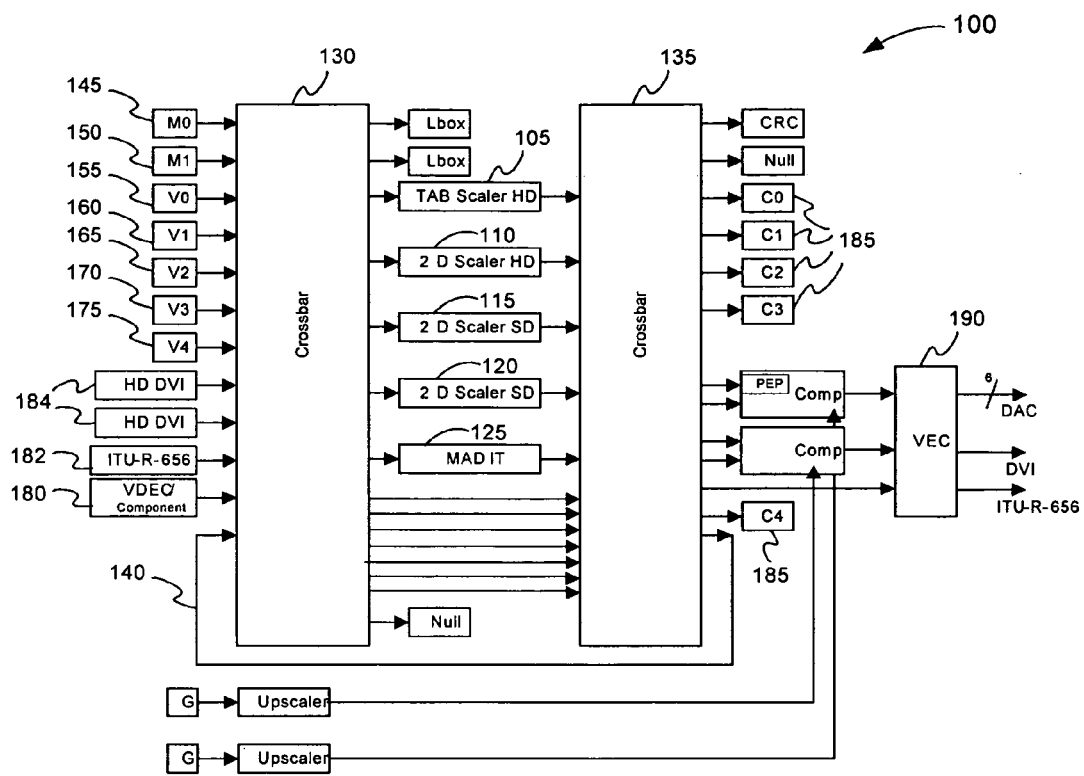
FIG. 1b illustrates a block diagram of an exemplary architecture of the display controller of FIG. 1a, in accordance with an embodiment of the present invention.

FIG. 1b illustrates a block diagram of an exemplary architecture of the display controller 100 of FIG. 1a, in accordance with an embodiment of the present invention. Referring to FIG. 1b, there is shown a display controller 100, which may be clocked with a single clock, which may be, for example, a 108 MHz clock. A motion adaptive deinterlacer with inverse telecine 3:2/2:2 (MAD-IT) 125 along with a plurality of scalers (105, 110, 115, and 120), for example, may be positioned between a first crossbar 130 and a second crossbar 135. The first crossbar 130 may be referred to as an input crossbar and the second crossbar 135 may be referred to as an output crossbar.

U.S. patent application Ser. No. 10/314,525 filed Dec. 9, 2002 entitled "Network Environment for Video Processing Modules" discloses an exemplary crossbar network module and associated system, which is representative of the video network crossbar that may be utilized in connection with the present invention. Accordingly, U.S. patent application Ser. No. 10/314,525 filed Dec. 9, 2002 is hereby incorporated herein by reference in its entirety.

A feedback path 140 may be provided from the output of the second crossbar 135 to the input of the first crossbar 130. This may allow any of the standard definition (SD) video sources such as the MPEG feeders 145 and 150, video feeders 155, 160, 165, 170 and 175, and/or video decoder (VDEC) 180, and so on, to function as an input to the MAD-IT 125 and/or one of the scalers 105, 110, 115, and 120. The VDEC 180 may be an analog video decoder that may process NTSC signals to separate the chroma color components from the luma color components. The MPEG feeders 145 and 150 may accept 4:2:0 and 4:2:2 video data and supply 4:2:2 video data. The video feeders 155, 160, 165, 170 and 175, may accept 4:2:2 video data and supply 4:2:2 video data. The output of the second crossbar 135 may be passed back to the first crossbar 130 via the feedback path 140.

A scaler such as, for example, scaler 105, 110, 115, or 120, may contain a line buffer that stores a plurality of lines of pixels for vertical scaling. The scaler may have, for example, a line buffer of 4×1280 pixels. Such a line buffer may be reconfigurable and may as a result be used to alleviate the RTS bandwidth of different scaling scenarios. For example, to scale down a picture by four in the vertical direction, a vertical scaler may produce one line for every four input lines. A portion of the line buffer may be placed after the vertical scaler to spread the data burst across multiple lines; thus lowering the output bandwidth.

Pixels for incoming streaming video may be captured as 4:2:2 YCrCb, for example. Video sources may utilize video capture to store the source to memory. A capture to memory function may be utilized. Capturing to memory may allow sync-slip to produce correct output frame rates, because input sources may not always be frame accurate to tolerance needed for NTSC or PAL output. Additionally, input sources may require cropping and scaling that cannot be done directly from input to output, and picture-in-graphic (PIG) windows require availability of all input pixels in order to scale the output. Storing the pixels in memory may ensure appropriate handling of these functions. Furthermore, capturing to memory may ensure appropriate time shifting of input sources and vertical or horizontal shifting of an output window anywhere on the screen. The video capture functions may be performed by a capture engine and related functions, which may be found in capture blocks 185.

A video feeder such as, for example, video feeders 155, 160, 165, 170 and 175, may fetch pictures captured in the main memory. The MPEG feeders 145 and 150 may have the capability to support 4:2:0 to 4:2:2 conversions. Standard video feeders may be used to play captured video from live sources, or to playback captured video from scaled MPEG sources (PIG and PIP windows).

The VDEC 180, ITU-656 input 182 and HD-DVI input port 184 may be forms of video input ports, and may sample and format video data arriving at fixed clock rates into the device. The modules of the video input ports may provide format information to software, provide various sync mechanisms to time-base blocks, and provide error recovery mechanisms to make the system robust to various input errors. Video from the video input ports may be scaled then captured or captured directly.

The video encoder (VEC) 190 may be adapted to function as a primary video output for the video network. The VEC 190 may resample data, insert timing, blanking and sync information, and modulate chroma where necessary for NTSC and PAL outputs. The video output to the VEC 190 may be output by a video feeder directly or output by the video feeder, scaled, then sent to the VEC 190.

The display controller 100 may support several modes of display. Some exemplary display modes that may be supported by the display controller may comprise full screen (Full), picture-in-picture (PIP), and picture-in-graphic (PIG).

In the full display mode, an input stream may be displayed utilizing a whole screen. Some scaling may be used to match the display resolution and aspect ratio. For example, a 1080i input stream may be scaled to 704×180 per field for a NTSC display. Full screen may include letterbox conversion on 4:3 displays, pillarbox conversion on 16:9 displays, pan scan conversion on 4:3 displays, non-linear horizontal display, and anamorphic 16:9 output on 4:3 display.

Figure 2A:
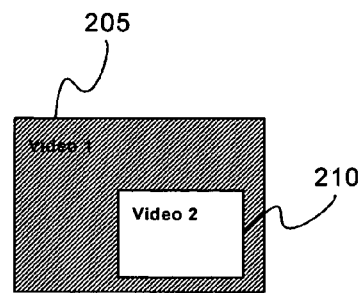
FIG. 2a illustrates an exemplary window PIP display, in accordance with an embodiment of the present invention.
Figure 2B:
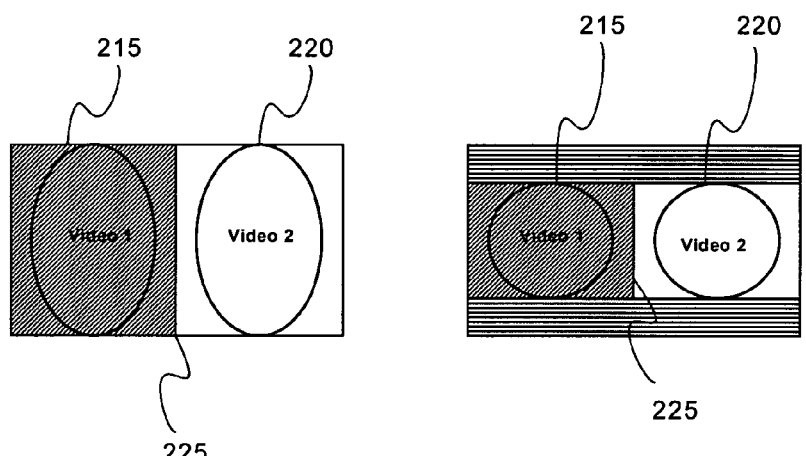
FIG. 2b illustrates an exemplary side-by-side PIP display, in accordance with an embodiment of the present invention.
Figure 2C:
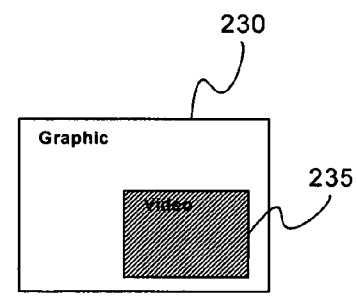
FIG. 2c illustrates an exemplary PIG display, in accordance with an embodiment of the present invention.

FIG. 2a illustrates an exemplary window PIP display, in accordance with an embodiment of the present invention. Referring to FIG. 2a, there is shown a window PIP that may comprise a full-screen input stream 205 and another windowed input stream 210. FIG. 2b illustrates an exemplary side-by-side PIP display, in accordance with an embodiment of the present invention. In the PIP mode, two video windows may be displayed on a screen. Referring to FIG. 2b, there is shown a side-by-side PIP that divides the viewing surface of a display into two regions 215 and 220 of the same size, sharing a common vertical boundary 225. Each region may be fully covered by an input stream (aspect ratio incorrect) or partially covered in letterbox format (aspect ratio correct). FIG. 2c illustrates an exemplary PIG display, in accordance with an embodiment of the present invention. Referring to FIG. 2c, for a PIG display mode, a display comprises a windowed input stream 230 and the rest of the viewing surface is covered by graphics 235.

In addition to the display modes, the display controller 100 may utilize different source modes for processing. Some of the used source modes may be full screen (Full) and cropped. In Full source mode, an input stream may be sourced utilizing a whole screen. Some scaling is required to match the display resolution and aspect ratio. For example, a 1080*i* input stream may be scaled to 704×180 per field for a NTSC display. In cropped source mode, an input stream may be sourced using only a portion of the screen. This may be done when the source is determined to be letterbox source, or pan-scan is selected. In either case, only a portion of the available source material may be selected for viewing.

Figure 3A:
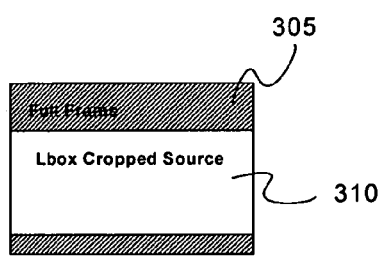
FIG. 3a illustrates an exemplary letterbox cropped source, in accordance with an embodiment of the present invention.
Figure 3B:
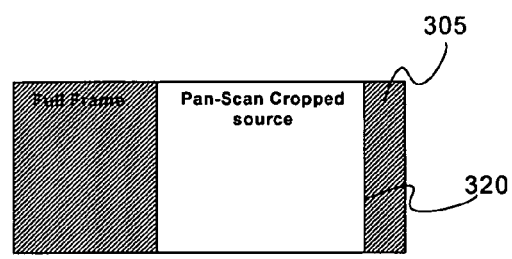
FIG. 3b illustrates an exemplary pan-scan cropped source, in accordance with an embodiment of the present invention.

FIG. 3a illustrates an exemplary letterbox cropped source, in accordance with an embodiment of the present invention. Referring to FIG. 3a, the letterbox cropped source may occupy a portion 310 of the full screen 305. FIG. 3b illustrates an exemplary pan-scan cropped source, in accordance with an embodiment of the present invention. Referring to FIG. 3b, the pan-scan cropped source may occupy a portion 320 of the full screen 305.

Figure 4:
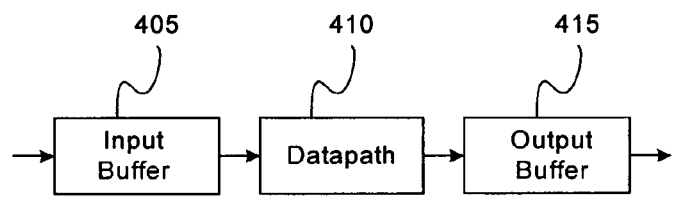
FIG. 4 illustrates a flow diagram of an exemplary display pipeline, in accordance with an embodiment of the present invention.

FIG. 4 illustrates a flow diagram of an exemplary display pipeline, in accordance with an embodiment of the present invention. Referring to FIG. 4, the display pipeline may comprise an input buffer 405, a datapath 410, and an output buffer 415. The input buffer 405 may convert a bursty input data stream into a steady supply for the datapath 410 to enhance its performance. The datapath 410 may be any processing of the video such as, for example, a scaler, a compositor, etc. The output buffer 415 may perform two functions. First, in instances where the result of the processing in the datapath 410 is written to the main memory, the output buffer 415 may be used as a staging area for memory writes. Second, in instances where the result of the processing in the datapath 410 is displayed directly, the output buffer 415 may be used to smooth the dataflow.

In an embodiment of the present invention, the datapath 410 may comprise processes that may alter the data rate such as, for example, video scaling. Inserting a video scaler in the display pipeline may alter the data rate in a per pixel basis during horizontal scaling and in a per line basis in vertical scaling. Therefore, where the process of scaling takes place may affect the bandwidth of the memory in the display controller.

Figure 5:
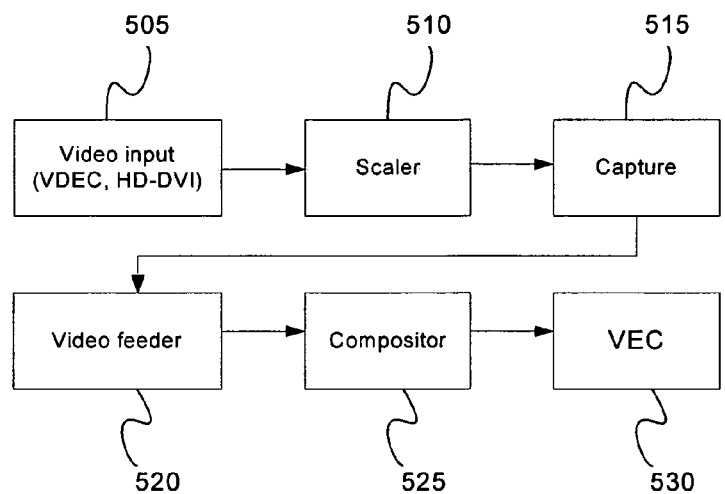
FIG. 5 illustrates a flow diagram of an exemplary dataflow with video input scaling-down, in accordance with an embodiment of the present invention.

FIG. 5 is a block diagram of an exemplary system that illustrates dataflow with video input scaling-down, in accordance with an embodiment of the present invention. Referring to FIG. 5, there is shown a video input 505, a scaler 510, a capture block 515, a video feeder 520, a compositor 525 and a VEC 530. The output of the video input block 505 may be coupled to an input of the scaler 510 and the output of the scaler 510 may be coupled to an input of the capture block 515. The output of the capture block 515 may be coupled to an input of the video feeder 520. An output of the video feeder 520 may be coupled to an input of the compositor 525 and an output of the compositor of 525 may be coupled to an input of the VEC 530. In the configuration of FIG. 5, the scaler 510 precedes capture block 515.

The video input 505 may comprise an input video stream, which may be in any one of a plurality of video formats. The scaler 510 may comprise hardware, software, or a combination thereof that may be capable of scaling input video 505 horizontally and/or vertically. The capture block 515 may comprise functionality capable of capturing an input video from the scaler 510 to memory. The video feeder 520 may oversee feeding the captured scaled video from memory to further processing such as, for example, the compositor 525. The compositor 525 may comprise functionality that may apply a layer to the video such as, for example, graphics, text, etc. The VEC 530 may then encode the video stream according to the requirements of the system and in a manner appropriate for the intended video decoder and display on which the video may be displayed.

In an embodiment of the present invention, for PIP and PIG images, the incoming video is usually scaled down. Scaling may be performed before capturing the input video or after the video feeder. A scale factor change may occur in situations such as, for example, changing to PIG or PIP display mode. The display controller may switch the display mode to PIP display mode, where a PIP window may utilize large scale-downs. Such large scale-downs may consume large bandwidth if done after the video feeder. In such a case it may be more efficient to use a scheme of input-scale-capture-feed-VEC as illustrated by FIG. 5, where the video input 505 may be initially scaled 510, then captured to memory 515. As a result, feeder 520 bandwidth may be conserved. Further processing such as, for example, compositing 525 may then be applied and sent to VEC 530. When the scaling 510 is performed prior to capturing 515, the video feeder 520 bandwidth may only need to support the pixel rate of the output, which may be smaller than the original input video.

The decision to use the scheme illustrated by FIG. 5, i.e., scaling then capturing may be based on whether scaling down may be needed. If scaling down, then the aforementioned scheme may be used. However, the decision may be based on other factors as will be shown hereinafter. For simplicity however, the scheme illustrated by FIG. 5 may be referred to as scaledown-capture.

In an embodiment of the present invention, the display controller may be in cropped images display mode, where the incoming video may be scaled up. A small portion of video may be selected for scaling up to fill the entire video frame store. Cropped images may either come from small, cropped regions or from letterbox source material that is cropped vertically to store as full screen. While scaling may be performed before or after the capture buffer, cropped input images generally need scaling-up to full size. Capture and video feeder bandwidth may be relieved when the scaling up is done after the video feeder. As a result it may be more efficient to use a scheme of input-capture-feed-scale-VEC as illustrated by FIG. 6, where the video input 605 may be initially captured to memory 610, sent through the video feeder 615, then scaled 620.

Figure 6:
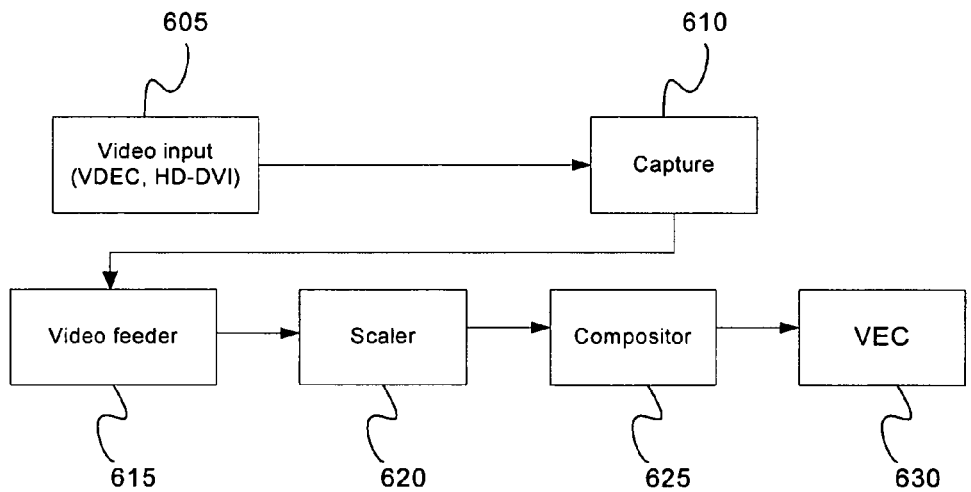
FIG. 6 illustrates a flow diagram of an exemplary dataflow with video input scaling-up, in accordance with an embodiment of the present invention.

FIG. 6 illustrates a flow diagram of an exemplary dataflow with video input scaling-up, in accordance with an embodiment of the present invention. Referring to FIG. 6, there is shown a video input 605, a capture block 610, a video feeder 615, a scaler 620, a compositor 625 and a VEC 530. An output of the video input block 605 may be coupled to an input of the capture block 610. An output of the capture block 610 may be coupled to an input of the video feeder 615 and an output of the video feeder 615 may be coupled to an input of the scaler 620. An output of the scaler 620 may be coupled to and input of the compositor of 625 and an output of the compositor may be coupled to an input of the VEC 630. In the configuration of FIG. 6, the capture block 610 precedes the scaler 620.

In operation, the video input 605 may comprise an input video stream, which may be in any one of a plurality of video formats. The capture 610 may comprise functionality capable of capturing an input video from the input block 605 to memory. The video feeder 615 may oversee feeding the captured video from memory to blocks where further processing may be applied to the video such as, for example, scaling 620 and compositing 625. The scaler 620 may comprise hardware, software, or a combination thereof that may be capable of scaling input video horizontally and/or vertically. The compositor 625 may comprise functionality that may apply a layer to the video such as, for example, graphics, text, etc. The VEC 630 may then encode the video stream according to the requirements of the system and in a manner appropriate for the intended video decoder and display on which the video may be displayed.

The decision to use the configuration illustrated by FIG. 6, which comprises capturing preceding scaling may be based on whether scaling up may be needed. If scaling up, then the aforementioned scheme may be used. However, the decision may be based on other factors as will be shown hereinafter. For simplicity however, the scheme illustrated by FIG. 6 may be referred to as capture-scaleup.

The decision to use the scaledown-capture scheme over the capture-scaleup scheme and vice versa may be done at the video input. In one video stream, changes in the type of input and the display mode may trigger making a decision as to the order in which scaling and capturing may be done. One goal of this decision is to minimize the capture bandwidth versus the feeder bandwidth. One effect of such a decision may be storing the least amount of data in the capture-playback buffers. In this regard, if the bandwidth for the scaledown-capture scheme is less than the bandwidth for the capture-scaleup, then scaledown-capture may be chosen, and vice versa. Making this decision may be achieved by comparing a scaledown-capture bandwidth estimate with a capture-scaleup bandwidth estimate.

The following simple approximation may be utilized to determine the scaledown-capture bandwidth estimate at the capture:

$$I_{Out} = O_x \times O_y, \quad (1)$$

where $I_{Out}$ may be the output scaled image size, $O_x$ the image output x dimension and, $O_y$ the image output y dimension. Then the capture time, CaptTime may be calculated as follows:

$$CaptTime = \frac{Iline}{Iclk} \times Iy, \quad (2)$$

where Iline may be the input line samples per horizontal line (including hblank), Iclk the input pixel clock, and $I_y$ the image input y dimension. The estimate of the scaledown-capture bandwidth may then be:

$$I_{BW} = \frac{I_{Out}}{CaptTime}. \quad (3)$$

Similarly, the following approximation may be utilized to determine the capture-scaleup bandwidth estimate at the video feeder:

$$I_{In} = I_x \times I_y, \quad (4)$$

where $I_{In}$ may be the input scaled image size, $I_x$ the image input x dimension, and $I_y$ the image input y dimension. Then the feeder time, FeedTime may be calculated as follows:

$$FeedTime = \frac{Oline}{Oclk} \times Oy, \quad (5)$$

where Oline may be the output line samples per horizontal line (including hblank), Oclk the output pixel clock, and $O_y$ the image output y dimension. The estimate of the capture-scale up bandwidth may then be:

$$O_{BW} = \frac{I_{In}}{FeedTime}. \quad (6)$$

The decision is then made as follows: if the scaledown-capture bandwidth is larger than the capture-bandwidth then the best choice may be to perform capture prior to scale up. If the opposite is true, then the best choice may be to perform scaledown prior to capture.

In this regard, the decision may be determined as followed:

$$I_{BW} > O_{BW} \quad (7)$$

If this decision is true, then bandwidth may be conserved through capture-scaleup, where capture may run at the input pixel rate, and scaleup occurs after the video feeder as shown in FIG. 6. On the other hand, if this decision is false, then bandwidth may be conserved through scaledown-capture, where video feeder may run at the output pixel rate, and scaledown occurs before the video feeder as shown in FIG. 5. Therefore, the overall system bandwidth may be optimized by choosing how to crop/scale and capture/playback video.

Performing such decisions may allow arbitrary cropping and scaling on video inputs without hitting cases of extreme bandwidth.

This approach to cropping, scaling, capture and playback may save significant bandwidth. A large degree of flexibility to the user for cropping images to different sizes without encountering bandwidth constraints may be allowed with the system described herein. This system may be general enough to scale to any image size and pixel rate.

In an embodiment of the present invention, different combinations of input and output formats may be examined to determine the associated data rates. Since the video system may have a maximum clock rate that may not be exceeded, testing different combinations of input and output formats may ensure keeping the system data rate below the maximum rate. For each combination of an input and output video format, the impact on capture, feeder, and scaler inputs may be determined. For each combination the scaledown-capture and capture-scaleup schemes may be examined as well. A capture rate associated with the different combinations may then be determined. As a result, for each combination, all the possible data paths may be examined to determine the capture rates that would ensure that the hardware does not exceed the maximum allowed pixel clock rates. Each combination may be also examined taking into consideration a 1% oscillation test used with the capture-scale ordering as described hereinabove, and described in more detail in incorporated U.S. patent application Ser. No. 11/300,782 filed Dec. 15, 2005.

Analysis of data rates for all scenarios may be performed, for example, by software that may analyze source and output formats. As additional display capabilities are needed, the additional displays may be analyzed based on a dataflow model of the video network.

An embodiment of the present invention may support formats such as, for example, all ATSC formats, SD formats, PAL, NTSC, and a number of VESA formats. One of the input formats may yield a value for a capture blockout that may be used with all input formats, and one for the output format may yield a value for a video feeder blockout that may be used with all output formats to ensure keeping the data rate of the system below the maximum value.

As a result, once the optimal capture and video feeder blockout have been determined, any scale factor, any input/output format, any display, etc., may be utilized with the system, and the data rate may not exceed the maximum data rate allowed by the hardware. Once the system is set at the optimal capture and video feeder blockout, that decision may not be revisited until a change occurs in the system such as, for example, supporting a new format, adding a display, etc. As long as no changes occur, the system may have as input and as output any format, and the system may not exceed the maximum data rate allowed by the system.

Setting the capture and video feeder at optimal values may allow such operations as, for example, cropping or PIP, with any video format input and any display format out of a video system. All combinations of input and output formats, scaling factors, display modes, etc., may utilize a single, optimal value for memory bandwidth for capture and video feed as determined by the testing of the different combinations. As a result, the memory bandwidth needs of the system may be disassociated from the software usage of the video processing (scaling, cropping, etc.), which as a result, may simplify the system design, and optimize memory bandwidth.

Figure 7:
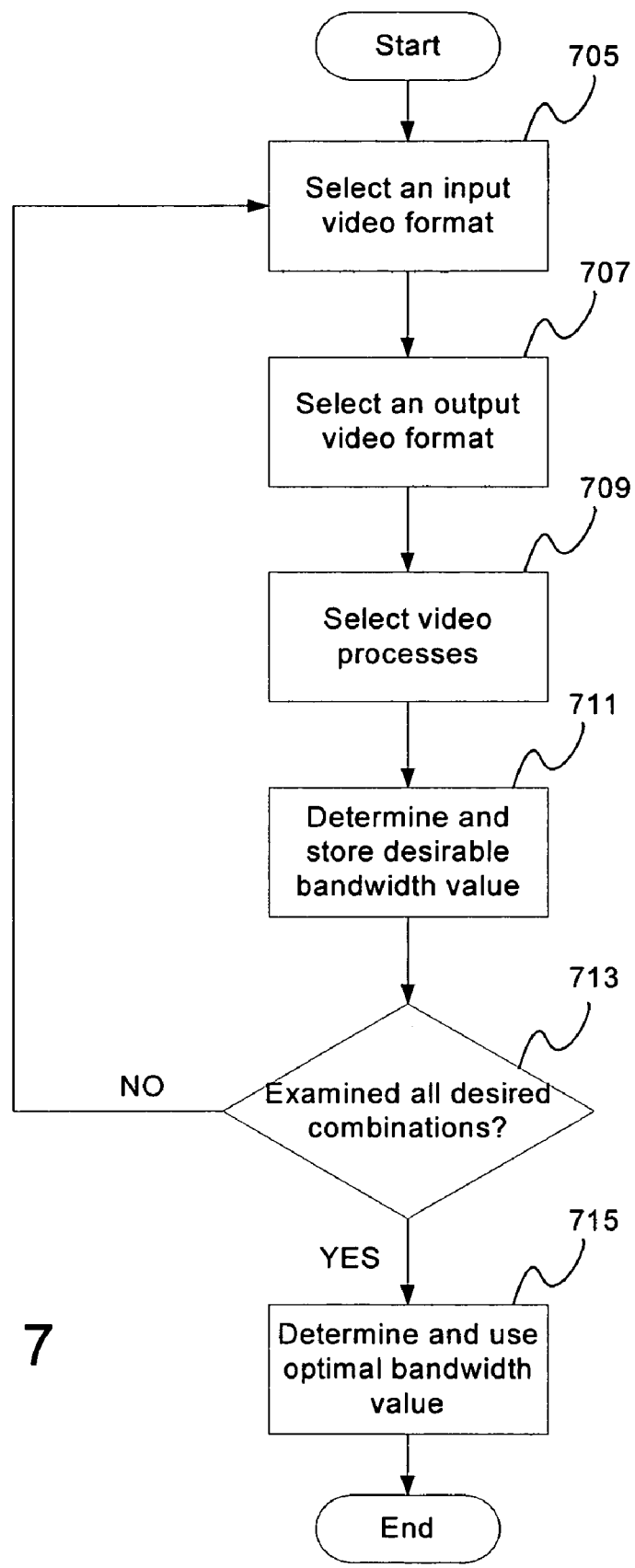
FIG. 7 illustrates a flow chart of an exemplary method for optimizing memory bandwidth in a video system, in accordance with an embodiment of the present invention.

FIG. 7 illustrates a flow chart of an exemplary method for optimizing memory bandwidth in a video system, in accordance with an embodiment of the present invention. The process may start by selecting an input video format at 705, and selecting an output video format at 707. Video processes may then be selected at 709, where the video processes may be, for example, scaling, cropping, preparing video for one of the several display modes discussed above, etc. The combination of the input and output formats, and the processes may then be examined at 711 and a desirable memory bandwidth associated therewith may be determined and stored. The desirable memory bandwidth may be such that it ensures that a maximum data rate associated with the system is not exceeded.

At 713, a decision may be made as to whether all desired combinations of input and output formats, and video processes have been explored. If not, the process may repeat again starting at block 705 for another combination for input and output formats, and video processes. When all desired combinations have been examined and determined, an optimal memory bandwidth value may be selected at 715. The optimal memory bandwidth may be a value that would ensure that for any of the combinations examined, the data rate always remains at or below the maximum allowed data rate of the system. The optimal memory bandwidth may be determined in terms of settings associated with the video capture and the video feeder operations.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for optimizing the performance of a video processing system, the method comprising:

determining in a processor a single memory bandwidth value for use during video processing that generates output video data for display from input video data, wherein:

utilizing said single memory bandwidth value during said video processing causes an overall data rate not to exceed a maximum data rate allowed by the video processing system; and said determined single memory bandwidth value is independent of a format of said input video data, a format of said output video, and said video processing that generates said output video data for display from said input video data; and scaling said input video data based at least in part on said single memory bandwidth value.

2. The method according to claim 1, further comprising determining memory bandwidth values for each of a plurality of combinations of:

said input video data format, said output video data format, and each of a plurality of processes utilized for said processing that generates said output video data for display from said input video data.

3. The method according to claim 2, further comprising selecting a memory bandwidth value from said plurality of combinations that results in said overall maximum data rate that does not exceed said maximum data rate allowed by the video processing system to represent said single memory bandwidth value.

4. The method according to claim 1, further comprising capturing said scaled input video data to generate a captured output, and processing the video data with a video feeder either prior to scaling or after scaling based on a scale down factor.

5. The method according to claim 4, further comprising:
processing said captured output to generate a processed captured output;
compositing said processed captured output to generate a composited output; and
processing said composited output via a video encoder to generate said output video data.

6. The method according to claim 1, further capturing said input video data based at least in part on said single memory bandwidth value.

7. The method according to claim 6, further comprising processing said captured input video data by a video feeder to generate a processed output.

8. The method according to claim 7, further comprising:
scaling said processed output to generate a scaled output;
compositing said scaled output to generate a composited output; and
processing said composited output via a video encoder to generate said output video data.

9. A non-transitory machine-readable storage having stored thereon, a computer program having at least one code section for optimizing the performance of a video processing system, the at least one code section being executable by a machine for causing the machine to perform steps comprising:

determining a single memory bandwidth value for use during video processing that generates output video data for display from input video data, wherein:
utilizing said single memory bandwidth value during said video processing causes an overall data rate not to exceed a maximum data rate allowed by the video processing system; and
said determined single memory bandwidth value is independent of a format of said input video data, a format of said output video, and said video processing that generates said output video data for display from said input video data; and
scaling said input video data based at least in part on said single memory bandwidth value.

10. The machine-readable storage according to claim 9, further comprising code for determining memory bandwidth values for each of a plurality of combinations of:

said input video data format, said output video data format, and each of a plurality of processes utilized for said processing that generates said output video data for display from said input video data.

11. The machine-readable storage according to claim 10, further comprising code for selecting a memory bandwidth value from said plurality of combinations that results in said overall maximum data rate that does not exceed said maximum data rate allowed by the video processing system to represent said single memory bandwidth value.

12. The machine-readable storage according to claim 9, further comprising code for capturing said scaled input video data to generate a captured output, and processing the video data with a video feeder either prior to scaling or after scaling based on a scale down factor.

13. The machine-readable storage according to claim 12, further comprising:
code for processing said captured output to generate a processed captured output;
code for compositing said processed captured output to generate a composited output; and
code for processing said composited output via a video encoder to generate said output video data.

14. The machine-readable storage according to claim 9, further comprising code for capturing said input video data based at least in part on said single memory bandwidth value.

15. The machine-readable storage according to claim 14, further comprising processing said captured input video data by a video feeder to generate a processed output.

16. The machine-readable storage according to claim 15, further comprising:
code for scaling said processed output to generate a scaled output;
code for compositing said scaled output to generate a composited output; and
code for processing said composited output via a video encoder to generate said output video data.

17. A system for optimizing the performance of a video processing system, the system comprising:
at least one processor that determines a single memory bandwidth value for use during video processing that generates output video data for display from input video data, wherein:
utilizing said single memory bandwidth value during said video processing causes an overall data rate not to exceed a maximum data rate allowed by the video processing system; and
said determined single memory bandwidth value is independent of a format of said input video data, a format of said output video, and said video processing that generates said output video data for display from said input video data;
a scaler that scales said input video data if said at least one processor determines that said input video data is to be scaled prior to being captured; and
a capture processor that captures said scaled input video data to generate a captured output, and processes the video data with a video feeder either prior to scaling or after scaling based on a scale down factor.

18. The system according to claim 17, wherein said at least one processor determines memory bandwidth values for each of a plurality of combinations of:

said input video data format, said output video data format, and each of a plurality of processes utilized for said processing that generates said output video data for display from said input video data.

19. The system according to claim 18, wherein said at least one processor selects a memory bandwidth value from said plurality of combinations that results in said overall maximum data rate that does not exceed said maximum data rate allowed by the video processing system to represent said single memory bandwidth value.

20. The system according to claim 17, wherein the video feeder is configured to process said captured output to generate a processed captured output, and the system further comprises:
  a compositor that composites said processed captured output to generate a composited output; and
  a video encoder that processes said composited output to generate said output video data.

21. The system according to claim 17, wherein the capture processor is configured to capture said input video data if said at least one processor determines that said input video data is to be captured prior to being scaled.

22. The system according to claim 21, wherein the video feeder is configured to generate a processed output.

23. The system according to claim 22, wherein the scaler is configured to generate a scaled output, and the system further comprises:
  a compositor that composites said scaled output to generate a composited output; and
  a video encoder that processes said composited output to generate said output video data.

24. A system for optimizing the performance of a video processing system, comprising:
  means for determining a single memory bandwidth value for use during video processing that generates output video data for display from input video data, wherein:
    utilizing said single memory bandwidth value during said video processing causes an overall data rate not to exceed a maximum data rate allowed by the video processing system; and
    said determined single memory bandwidth value is independent of a format of said input video data, a format of said output video, and said video processing that generates said output video data for display from said input video data; and
  means for processing the video data with a video feeder either prior to scaling or after scaling based at least in part on a scale down factor.

* * * * *